United States Patent [19]

Ozawa

[11] Patent Number: 4,466,649
[45] Date of Patent: Aug. 21, 1984

[54] EXTENDABLE HAND AMUSEMENT DEVICE

[75] Inventor: Shoji Ozawa, Nagareyama, Japan

[73] Assignee: Tomy Kogyo Co., Inc., Tokyo, Japan

[21] Appl. No.: 382,241

[22] Filed: May 26, 1982

[30] Foreign Application Priority Data

May 30, 1981 [JP] Japan .............................. 56-79128[U]

[51] Int. Cl.$^3$ ............................................... B25J 1/02
[52] U.S. Cl. .................................... 294/19 R; 3/12.7; 403/109
[58] Field of Search ...................... 294/19 R, 19 A, 20, 294/22, 50.8, 50.9, 99 R, 104, 106, 115; 3/12, 12.6, 12.7; 46/119, 120, 126; 56/332, 333; 403/109, 377

[56] References Cited

U.S. PATENT DOCUMENTS

| | | | |
|---|---|---|---|
| 2,245,993 | 6/1941 | McCoy | 403/109 X |
| 3,317,997 | 5/1967 | Hedstrom et al. | 294/19 R X |
| 4,208,830 | 6/1980 | Yoshida | 294/19 R |

Primary Examiner—Johnny D. Cherry
Attorney, Agent, or Firm—Staas & Halsey

[57] ABSTRACT

In a mechanical hand amusement device there is provided a handle with a movable grip member joined to an elongated arm, and a hand member having a fixed thumb and four flexible finger members joined to a shaft housed within and capable of moving along the length of the elongated arm. A spring, one end of which is connected to the arm, and the other end of which is connected to the shaft, holds the shaft in tensioned relationship with the arm to induce sliding of the shaft along the arm when a release mechanism is activated. In addition, the grip member and the hand member are connected by a continuous string which further winds through two pulleys. One pulley is connected to the arm through a slit in the shaft, and the other pulley is connected to the shaft. When the release button is pushed, the shaft extends from the arm and the length of string between the respective pulleys is decreased but the length of string between the pulleys and the ends of the device is increased. Again, the grip member may be squeezed in this extended position to activate the flexible hand. Thus, with the shaft in either the non-extended or extended position, the grip member is capable of operating the hand member.

23 Claims, 7 Drawing Figures

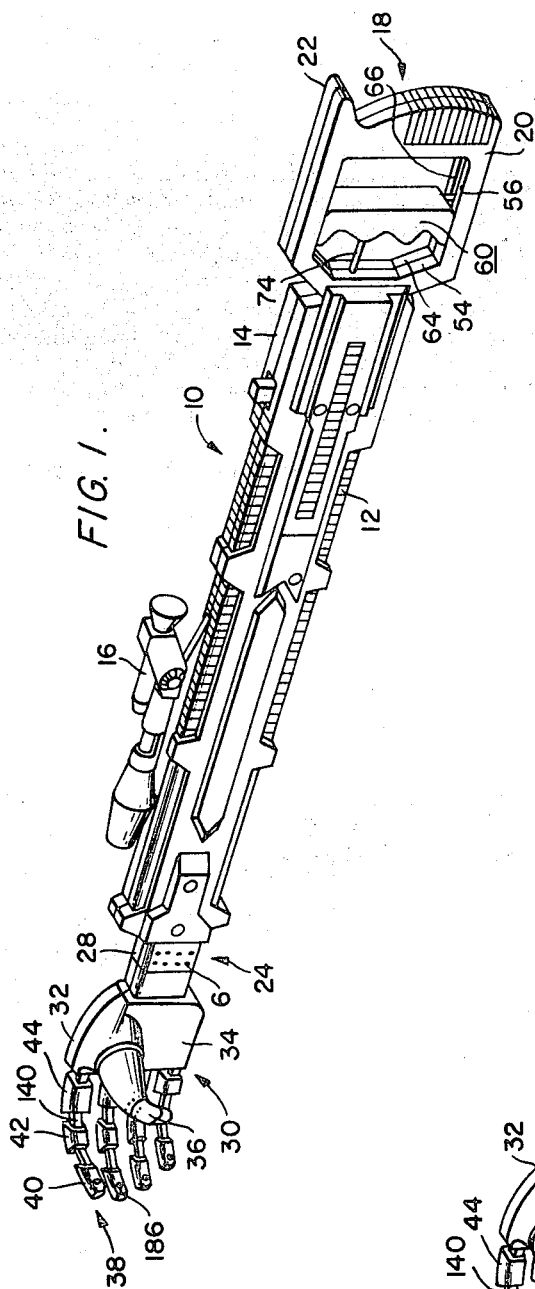
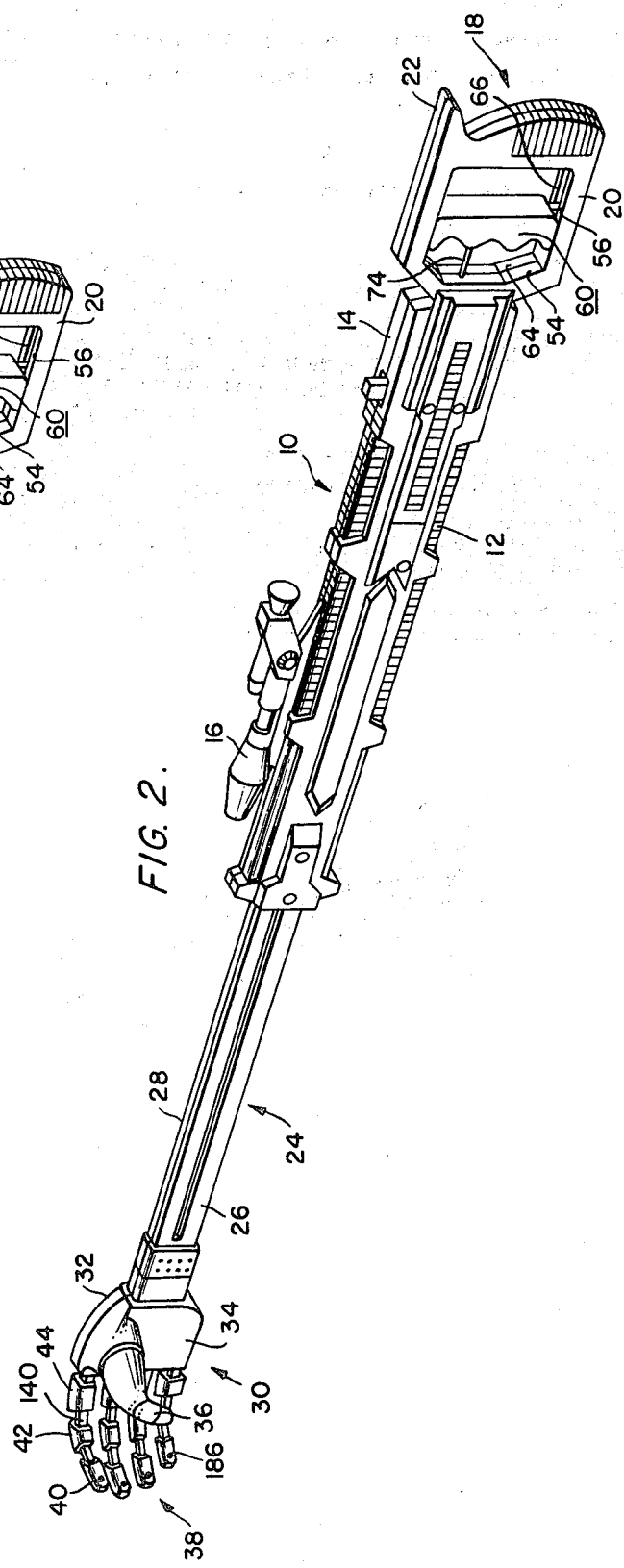

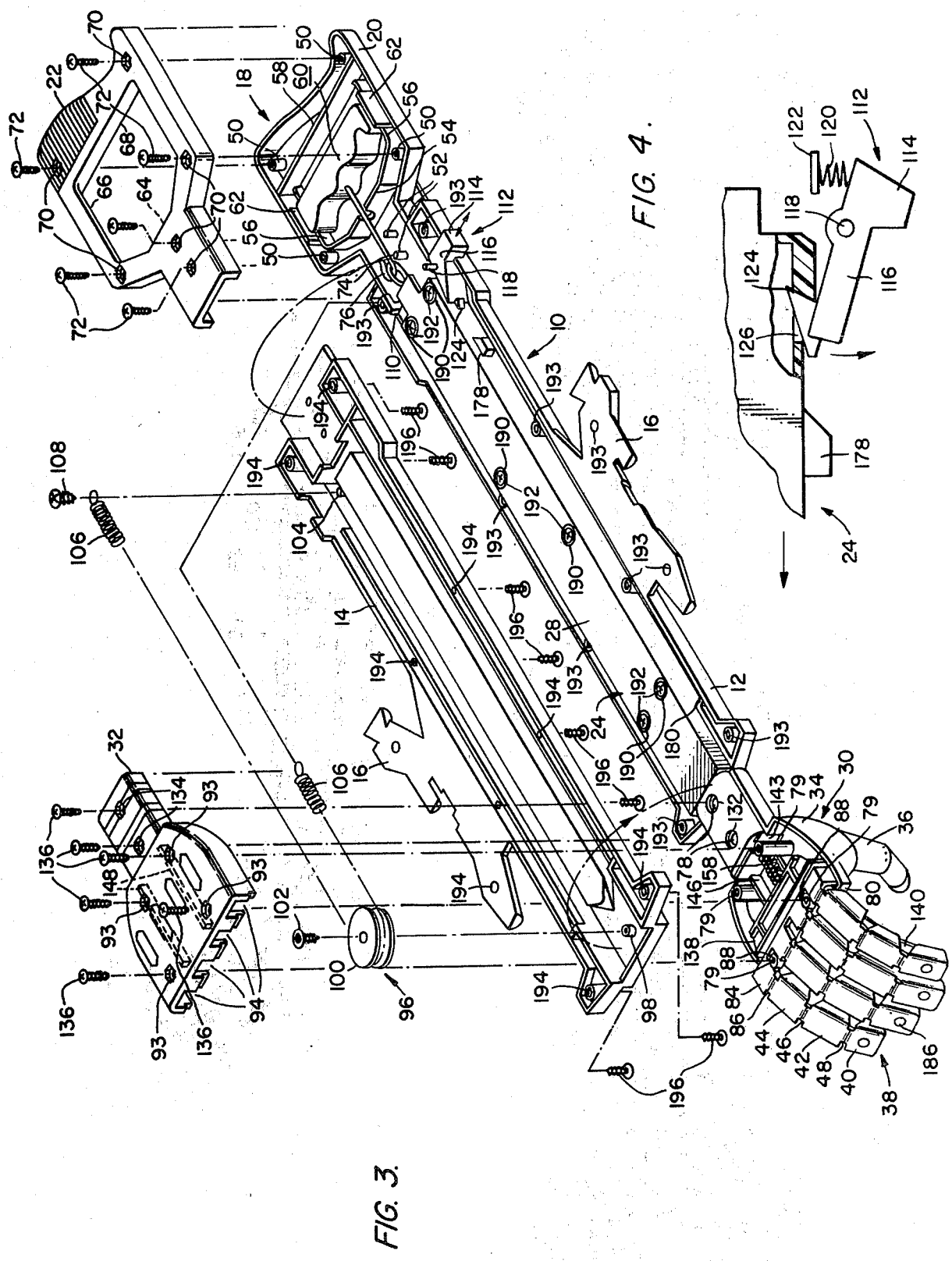

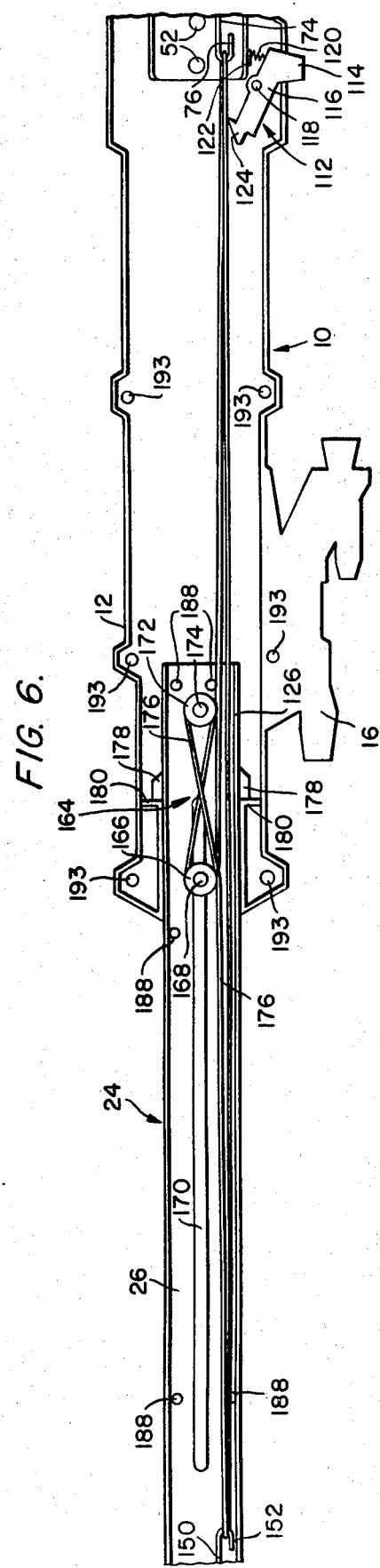

EXTENDABLE HAND AMUSEMENT DEVICE

BACKGROUND AND SUMMARY OF THE INVENTION

Amusement devices employing various gripping devices are known in the art. For example, U.S. Pat. Nos. 4,208,830 and 4,315,650, both of which are expressly incorporated herein, disclose grips operatively connected to flexible hands. However, the prior art does not teach any means for allowing the flexible hand to be extended relative to the grip while still allowing the flexible hand to be operated.

The present invention relates to an amusement device, and in particular, to an extendable mechanical hand amusement device having a hand with a fixed thumb and movable finger members at one end which curl inward when a grip member located at the other end of the device is squeezed. Upon release of the handle grip, a spring within the hand member restores the grip member to its normal position and allows the fingers to uncurl. Small resilient fingertip members are also provided at the ends of the finger tips to increase gripping power.

Between the hand and the grip member of the present invention is a gun stock-like arm which houses an extendable shaft. The arm and the shaft are further connected by an elongated spring. When a release button located on the arm is pushed, the shaft under spring tension is allowed to extend from the arm, thereby extending the overall length of the amusement device. The extension of the shaft stops when projections on the shaft abut flanges on the end of the arm.

The body of each of the finger members more specially is formed by a single plastic element having three hollow segments joined at the top by flexible hinges. The segments are not joined at the bottoms, which are smaller than the tops so as to allow bending motion. A flexible strap is connected to the fingertip segment of each finger and extends through and along the bottom of the remaining segments into the hand member, where it is coupled to a rod terminating in a hook. The grip member also is connected to a rod terminating in a hook. Between the hooks of these two rods is placed a continuous string further wound about two pulleys, one of which is connected to the arm through a slit in the shaft and the other is connected to the shaft itself.

After the release button is activated, the shaft is quickly caused to move to its extended position under the tension of the spring and the length of string between the two pulleys is shortened, but the length of string between the respective pulleys and the ends of the device is increased. This configuration provides a continuous, taut connection between the grip member and the hand member. Thus, whether the shaft is in the extended or non-extended position, power exerted at the grip member by a user is transmitted to the rod connected to the hand via the string. The power exerted moves the rod and causes the straps to be retracted into the hand member, thereby again curling the finger members inwardly towards the palm.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the extendable mechanical hand device of the present invention, illustrating generally the device in the non-extended position;

FIG. 2 is a perspective view of the extendable mechanical hand device of the present invention, illustrating generally the device in the extended position;

FIG. 3 is a perspective view of the extendable mechanical hand device of the present invention with the top removed, illustrating generally the location of the extendable shaft and the spring mechanism used between the shaft and the arm;

FIG. 4 is a left side view of the mechanism for releasing the extendable shaft;

FIG. 6 is a top, cut-away view of the device of the present invention generally illustrating the configuration of the pulley system in the extended position.

DESCRIPTION OF THE PREFERRED EMBODIMENT

Figure 7:
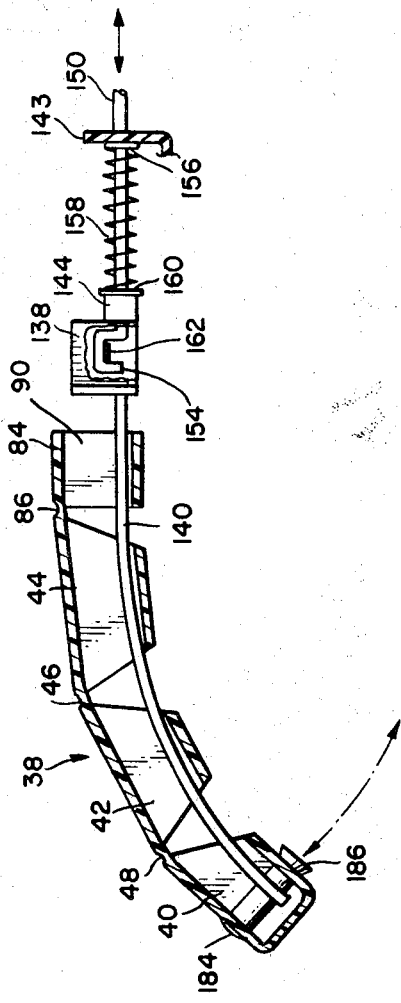
FIG. 7 is a left side view of a finger member having hollow segments connected to a flexible strap along the bottom thereof, and being further connected to the end of the pulley system.

The mechanical hand amusement device of the present invention is generally illustrated in FIGS. 1 and 2, and includes an arm 10 having a left arm piece 12 and a right arm piece 14, a site 16 molded to the top of arm pieces 12 and 14, a handle 18 having a left handle piece 20 and a right handle piece 22 at one end of the arm 10, an extendable shaft 24, having a left shaft piece 26 and a right shaft piece 28, and a hand member 30 at the end of the shaft 24. Hand member 30 includes top hand member 32, palm member 34, and digits such as fixed thumb member 36 and four movable finger members 38. As best seen in FIG. 7, each movable finger member 38 includes a first segment 40, a second segment 42, and a third segment 44; segments 42 and 44 are joined by a flexible hinge 46, and segments 40 and 42 are joined by a flexible hinge 48.

FIG. 2 illustrates the expandable feature of the present invention. It can be seen from FIG. 1 that shaft 24 is usually housed within and is extendable from the arm 10. With the shaft of the amusement device of the present invention extended, the overall length of the device is almost doubled, while the hand is still capable of being operated by the grip member, as will be described later.

Turning now to FIG. 3, left handle piece 20 is provided with several threaded cylinders 50, two other threaded cylinders 52, and flanges 54, 56 and 58. Flanges 56 are of lesser height than flanges 54 and 58, so as to accommodate projections 62 of grip member 60 and thereby allow grip member 60 to undergo reciprocating movement when it is squeezed and released. Right handle piece 22 is provided with flanges 64, 66 and 68 corresponding to flanges 54, 56 and 58 of the left handle piece 20 and holes 70 which correspond to threaded cylinders 50 and 52 of lower handle 14 through which screws 72 extend so as to join left handle piece 20 and right handle piece 22 with grip member 60 therebetween. Metal rod 74, embedded in grip 60, extends to the end of the left and right handle pieces 20 and 22 and terminates in a hook 76.

Palm member 34 is provided with threaded cylinders 78 and 79, and a flange 80 which has four slots 82 through which finger members 38 extend. Knuckle element 84, which is joined to the third finger segments 44 by flexible hinges 86, is provided with holes 88 through which several of threaded cylinders 79 extend so as to firmly mount knuckle element 84 within the hand member 30. Element 84 is also provided with four openings 90, whose purpose will be described later, in relation to the fingers 38. The top hand member 32 has holes 93 corresponding to threaded cylinders 78 and 79 of palm member 34. In addition top hand member 32 has slots 94 corresponding to slots 82 through which finger members 38 extend.

As also seen in FIG. 3, between the handle 18 and the hand 30, and within the arm 10, is the spring mechanism 96 for extending the shaft 24. Inside the arm 10 is located the spring mechanism 96. The spring mechanism 96 has a cylindrical projection 98 located on the right arm piece at the end closest to the hand member 30, to which is rotatably mounted a pulley 100 by means of, for example, a broad-headed screw 102. At the other end of the right arm piece 14, the end closest the handle 18, is located another cylindrical projection 104 to which is attached one end of an elongated spring 106 by means of, for example, another broad-headed screw 108. Thus, the spring 106 extends from the cylindrical projection 104, along the length of the bottom of the right arm piece 14, around the pulley 100, extends back along the top of the right arm piece 14 in the direction of the handle 18, and finally attaches to a hook 110 located on the right shaft piece 28. In this configuration, the spring 106 is held in a taut relationship between the cylindrical projection 104 and the hook 110. When the hand is in the non-extended position, as illustrated in FIG. 1, the spring is relatively more taut than when the hand is in the extended position as illustrated in FIG. 2 (i.e., when the absolute distance between the cylindrical projection 104 and the hook 110 is less).

FIG. 4 illustrates the release mechanism 112 for releasing the shaft 24 and allowing it to be extended under the tension of the spring mechanism 96. The release mechanism 112 has a hollow button 114 connected to a lever 116 which is pivotally mounted to the arm 10 by a pin 118. One end of a short spring 120 is positioned within the button 114 and the other end abuts a flange 122 located on the left arm piece 12 at the end nearest the handle 18. At the end of lever 116, opposite the end with the button 114, is a projection 124 normally resting in a hole 126 formed in the wall at the intersection of both the right and left shaft pieces 28 and 26. The spring 120 normally urges the button 114 to extend out through the hole 128 in the top of the arm 10 and causes the lever 116 to pivot, whereby the projection 124 rests within the hole 126. When the button 114 is pressed by the user of the device, the lever 116 pivots and the projection 124 leaves the hole 126. The entire shaft 24 is then free to extend under the tension produced by the spring mechanism 96 connected between the arm 10 and the shaft 24.

Figure 5:
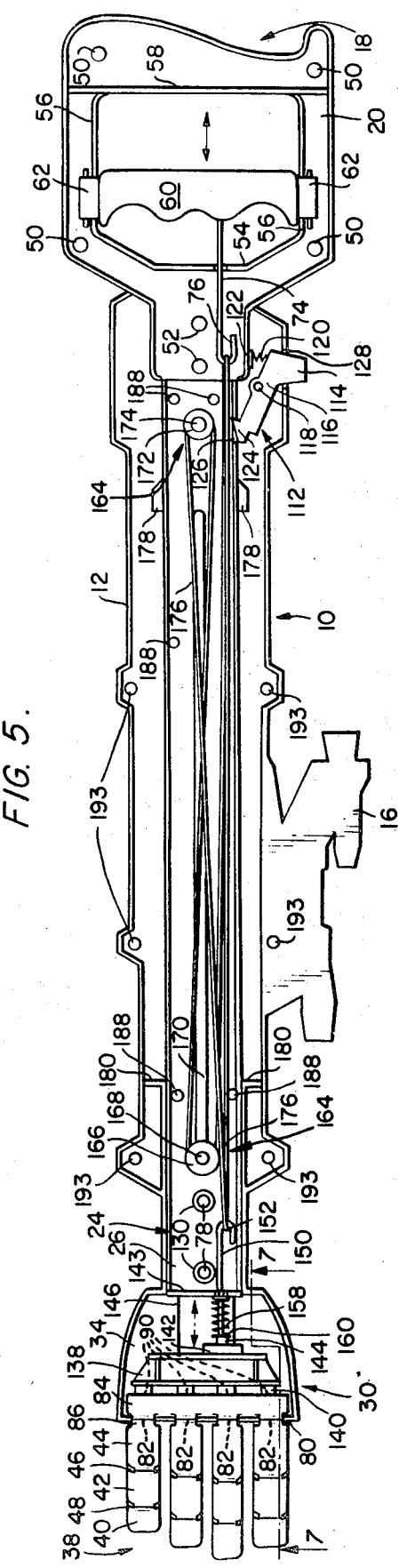
FIG. 5 is a top plan view of the amusement device, illustrating generally the configuration of the pulley system connecting the grip member with the movable finger members while the device is in the non-extended position.

Turning now to FIG. 5, the threaded cylinders 78 of palm member 34 extend through holes 130 in left shaft piece 26, through holes 132 in right shaft piece 28 (shown in FIG. 3) and finally into holes 134 in the top hand member 32 so as to provide for secure mounting by screws 136 of the hand member 30 over the end of the shaft 24.

Displaceable member 138 is provided with four flexible straps 140, and a flange 142 having a notch 144. Displaceable member 138 rests on two perpendicular flanges 146 molded into palm member 34. Corresponding perpendicular flanges 148 are also molded into the top hand member 32 and rest upon the top of the displaceable member 138. Rod 150, which has one hook 152 at the end located proximate to threaded cylinders 78, and another hook 154 at its other end positioned within the displaceable member extends through a flange 143 located at the wrist position of the hand member 30, a washer 156, a spring 158, which is located between flange 143 and notch 144, through another washer 160, through the notch 144 and the flange 142, and finally into the interior region of displaceable member 138. There, hook 154 at the end of rod 150 engages a metal strip 162, which is fixedly secured to displaceable member 138.

FIGS. 5 and 6 also illustrate the pulley mechanism 164 for transferring the pressure exerted upon the grip 60 to the hand 30. The pulley mechanism comprises a first pulley 166 located within the left shaft piece 26 and connected by a pin 168 to the left arm piece 12 at the end closest the hand 30. The pin 168 extends through a slit 170 running centrally almost the length of the left shaft piece 26, such that the left shaft piece 26, and thus the entire shaft 24 can be extended freely back and forth along the arm 10 without its movement impeded by the pin 168 through the shaft 24. Another pulley 172 is connected by a pin 174 to the other end of the left shaft piece 26. A continuous string 176, preferably made of a strong material such as nylon, is used to link the pulley system with the grip member 60 and the hand member 30. Arbitrarily, the string 176 begins at the hook 76 of metal rod 74, extends in the direction of the hand 30, is placed around the pulley 166, extends back towards the handle 18, is placed around the pulley 172, extends again in the direction of the hand 30, is connected to the hook 152 of metal rod 150, and finally returns to the hook 76 near the handle 18, where the string meets with its other end.

It will be apparent that regardless whether the shaft 24 is in the extended or the non-extended position, when the grip member 60 is squeezed, rod 74 will be moved and will transmit pressure through the string 176 and cause displaceable member 138 to be retracted towards the handle 18 causing the fingers 38 to curl inward. Moreover, when grip member 60 is released, the tension of spring 158 will restore displaceable member 138 and grip member 60 to their former positions.

Due to the stationary configuration of the pulleys 166 and 172 relative to the arm 10 and the shaft 24 to which they are respectively attached, and the slidable characteristic of the shaft 24 within arm 10, when the button 114 is pushed thereby releasing the shaft 24 for extension, the length of string 176 between the two pulleys 166 and 172 is reduced, but there is an inversely proportional increase in the length of string 176 between each pulley 166 and 172, and its nearest respective hook 152 or 76, and between the two hooks themselves 152 and 76.

As best seen in FIG. 6, under the tensioned relationship caused by the spring 106, once the shaft 24 is released, it continues to extend until projections 178, which lie on both sides of the shaft 24 at the end farthest away from the hand 30, finally engage flanges 180 located on both the left and right arm pieces 12 and 14. Once the shaft 24 is extended to its furthest position, it is held extended by the tension produced by the spring 106. In order to return the shaft 24 to its non-extended position housed within the arm 10, the shaft 24 must be manually pushed into the arm by the user of the device until the projection 124 of the lever 116 engages the hole 126 of the shaft 24, thereby holding the shaft 24 in the non-extended position until the button 114 is again pushed by the user.

With reference to FIG. 7, straps 140 extend through openings 90 in element 84, third segment 44, second segment 42, and are fixedly attached to the inside of the first segment 40 by rivets 184. In addition to securing straps 140 to the finger members 38, the rivets 184 also mount rubber fingertip members 186 outside the segments 40 to increase gripping power.

Finally, the means for assembling the device can be seen with reference to FIGS. 5 and 6. Left shaft piece 26 has molded therein, threaded cylinders 188 which correspond to holes 190 in the right shaft piece 28 to enable the two shaft pieces to be secured together around the pulley mechanism 164 by screws 192 (seen in FIG. 3). Similarly, left arm piece 12 has molded thereon threaded cylinders 193 (and as mentioned, 52) which correspond to holes 194 in the right arm piece 14 to enable the two arm pieces to be secured together around the shaft 24, the spring mechanism 96, and parts of the handle 18 and the hand 30, by screws 196. The use of the amusement device will now be described.

The user may pick up the amusement device of the present invention by using both hands. One hand is preferably placed around the handle 18 with the fingers of that hand inserted partially around the grip member 60. The user may support the weight of the amusement device by placing his other hand under the arm 10. Assuming the shaft 24 is in the non-extended position, the user has the choice of simply operating the mechanical hand 30 while it is in the non-extended position by squeezing the grip member 60, or he may extend the shaft 24 and operate the hand 30 while it is in the extended position.

To extend the shaft 24, the user merely pushes the release button 114 freeing the shaft 24 for extension. Once free, the spring 106 causes the shaft 24 to immediately extend out of the arm 10 until the projections 178, which lie on both sides of the shaft 24 at the end farthest away from the hand 30, finally engage flanges 180 located on both the left and right arm pieces 12 and 14. Once extended to its farthest position, the shaft 24 is held in the extended position by the tension produced by the spring 106.

In the extended position, when the grip member 60 is squeezed, it accordingly pulls the metal rod 74 which causes the string 176 to become more taut around pulleys 166 and 172 and thereby exert pressure upon the hook 152 to move the displaceable member 138 and the finger members 38.

To return the shaft 24 to its normal, non-extended position, the user manually pushes the shaft 24 back into the arm 10 until the spring-urged projection 124 of the lever 116 engages the hole 126 of the shaft 24, thereby holding the shaft 24 in the non-extended position. As the shaft 24 moves back into the arm 10, the pulleys 166 and 172 necessarily move apart and the length of string 176 connecting them increases, while the lengths of string 176 connecting the pulleys 166 and 172 to their respective nearest hooks 152 and 76, becomes proportionally smaller. The user then again has the option of either manipulating the mechanical hand 30 in the non-extended position, or he may push the button 114 to again extend the shaft 24.

In either the extended or the non-extended positions, it is apparent that the total distance between knuckle element 84 and the end of each outstretched finger member 38 is equal to the length of segments 40, 42 and 44, plus the smaller lengths of hinges 46, 48 and 86. When grip member 60 is squeezed, however, the effective length of the straps 140 extending along the bottoms of the finger members 38 is decreased. It will be noted that spacers can be provided upon the straps 140, and hidden from sight within segments 42 and 44, so as to loosely hold the straps 140 at the bottoms of the finger members 38. It is also apparent that squeezing grip member 60 decreases the length of the bottom of each finger member 38 with respect to the top of the same member. Under the influence of the forces thus created, hinges 46, 48 and 86 flex in simulation of the movement of the human hand. The fingers move inwardly in a grasping motion and can clasp objects against fixed thumb member 36. When grip member 60 is released, spring 158, which has been squeezed between flange 143 and notch 144, expands and restores grip member 60 and displaceable member 138 to their normal, at-rest positions. The force of spring 158, in addition to the natural resilience of the hinges 46, 48 and 86, causes the finger members 38 to extend outwardly to the normal open-hand position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:
1. An amusement device, comprising:
   (a) an arm having a first end and a second end;
   (b) a shaft member also having a first end and a second end and being slidably connected in parallel relation to said arm for sliding in a direction away from said first end of said arm;
   (c) a grip member movably mounted at said first end of said arm;
   (d) a hand member mounted at said second end of said shaft member;
   (e) a first spring means for holding said shaft member with potential energy for movement relative to said arm, wherein said first spring means has an elongated cylindrical spring, one end of which is connected to a hook located at the first end of said shaft member, the other end of said spring being connected to said first end of said arm, and the middle of said spring substantially surrounding a pulley rotatably mounted to said second end of said arm;
   (f) means for releasing said shaft member from a normally stationary relationship relative to said arm and for allowing said first spring means to extend said shaft member from said arm;
   (g) stopping means for preventing said shaft member from totally leaving said arm when said release means and said first spring means are activated; and
   (h) means for operatively connecting said movable grip member with said hand member.

2. The amusement device as described in claim 1, wherein said means for connecting said grip member and said hand member comprises:
  (a) a first rod connected to said grip member, said first rod terminating in a hook;
  (b) a string connected to said hook on said first rod and extending along said shaft member in the direction of said hand member, wherein said string substantially surrounds a pulley rotatably connected to the second end of said arm through a slit in said shaft member parallel to and running almost the length of said shaft member;
  (c) said string further extending in the direction of said grip member wherein said string substantially surrounds a pulley rotatably connected to said first end of said shaft member;
  (d) said string again extending in the direction of the hand member wherein it attaches to a hook terminating a second rod;
  (e) said second rod being connected to a displaceable member linearly movable relative to said hand member.

3. The amusement device as described in claim 2, wherein the release means comprises:
  (a) a lever pivotally connected to said first end of said arm;
  (b) a hollow button terminating one end of the lever for fitting into a hole in said first end of said arm;
  (c) a projection located on the other end of the lever for fitting into a hole in said first end of said shaft member; and
  (d) a spring having one end positioned within the button and the other end abutting a flange located at the first end of the shaft member for biassing the button into said hole in said arm and for biassing said projection into said hole in said shaft member.

4. The amusement device as described in claim 3, wherein the stopping means comprises:
  (a) a plurality of projections located on said first end of said shaft member; and
  (b) a plurality of corresponding flanges located on said second end of said arm for abutting said projections and stopping movement thereof.

5. The amusement device as described in claim 4 wherein said hand member further comprises:
  at least one movable digit having a plurality of hollow segments joined by first flexible hinges.

6. The amusement device as described in claim 5, further comprising:
  a flexible strap corresponding to each of said at least one movable digit, said strap being fixed to the end of said at least one movable digit and extending through the remainder of the digit.

7. The amusement device as described in claim 6, wherein said displaceable member is attached to said strap corresponding to each said at least one movable digit.

8. The amusement device as described in claim 7, further comprising:
  second spring means disposed between said second end of said shaft member and said displaceable member to bias said displaceable member away from said shaft member.

9. The amusement device of claim 8, wherein said second spring means comprises:
  a cylindrical spring wrapped around said second rod, one end of said cylindrical spring pressing against said displaceable member.

10. The amusement device of claim 9, wherein said hand member has four movable finger members and a fixed thumb member, each of said finger members having three segments, one being a terminal segment.

11. The amusement device of claim 10, further comprising:
  four resilient fingertip members, one of said fingertip members being attached to the terminal segment of each finger member.

12. The amusement device of claim 11, further comprising:
  an element fixedly mounted within said hand member, each of said finger members being attached to said element by a further flexible hinge.

13. The amusement device of claim 12, wherein said element has four openings therein, each of said openings corresponding to one of said finger members, and said straps extend from said displaceable member to said finger members through said openings.

14. An amusement device, comprising:
  (a) a hollow arm;
  (b) a hollow shaft member slidably housed within the arm;
  (c) a grip member movably mounted at one end of said hollow arm;
  (d) a hollow hand member having a wrist end and a finger end, one end of said hollow shaft member being attached to said hand member at the wrist end thereof, and said finger end of said hand member having at least one slot therein;
  (e) at least one movable finger member having a plurality of hollow segments joined by first flexible hinges and having a terminal segment;
  (f) an element fixedly mounted within said hand member and positioned at said finger end thereof adjacent said at least one slot;
  (g) a second flexible hinge extending through said at least one slot to movably join said at least one finger member to said element;
  (h) a linearly movable displaceable member positioned within said hand member between the wrist end thereof and said element;
  (i) a flexible strap corresponding to each said at least one finger member, said strap having one end thereof fixed to the terminal segment of said at least one finger member and the other end thereof fixed to said displaceable member;
  (j) spring means to bias said displaceable member toward said element; and
  (k) means extending through said hollow arm for operatively connecting said displaceable member and said grip member, said operatively connecting means having a first rod terminating in a hook connected to said grip member, a string connected to said hook and extending along the inside of said shaft member in the direction of said hand member wherein the string substantially surrounds a pulley rotatably connected to said arm through a slit in said shaft member, then further extending in the direction of said grip member, wherein the string substantially surrounds a pulley rotatably connected to the shaft member, and again extends in the direction of said hand member where the string attaches to a hook terminating a second rod, said second rod being connected to a displaceable member linearly movable within said hand member and said displaceable member also being attached to the strap corresponding to each said at least one movable finger member.

15. The amusement device as described in claim 14, wherein said spring means is a spring disposed between said shaft member and said displaceable member for biassing said displaceable member away from said shaft member.

16. The amusement device of claim 15, further comprising:
means positioned between said spring and said shaft member for retaining said spring within said hand member.

17. The amusement device of claim 16, wherein said means for retaining said spring within said hand member comprises:
a flange having an opening therein through which said second rod extends, one side of said flange abutting one end of said shaft member and the other side of said flange abutting one end of said spring.

18. The amusement device as described in claim 17, wherein said hand member comprises a top member having two holes disposed therein adjacent the finger end, a palm member having two first threaded cylinders extending towards the two holes adjacent said finger end in said top member, and two screws extending through the holes adjacent said finger end in the top member to the first threaded cylinders of the palm member joining the top member and the palm member, and wherein said element is fixedly mounted within said hand member and has two second openings therein through which said first threaded cylinders pass to fixedly mount said element.

19. The amusement device of claim 18, wherein said top member has two holes therein disposed adjacent the wrist end, wherein said palm member has two second threaded cylinders extending towards the two holes adjacent the wrist end in the top member, and wherein said shaft member at the wrist end has two holes through which said second threaded cylinders pass, and further comprising two screws extending through the holes adjacent the wrist end in said top member to the second threaded cylinders of the palm member to join said top and palm members and to attach said shaft member thereto.

20. The amusement device as described in claim 19, wherein said element has a first opening therein corresponding to each said at least one finger member, and said strap corresponding to each said at least one finger member extending through the corresponding first opening.

21. The amusement device as described in claim 20, wherein said finger end of said hand member has four slots therein, wherein there are four finger members having a plurality of hollow segments joined by first flexible hinges, each finger member corresponding to one of the slots, wherein there are four second flexible hinges, each second hinge corresponding to one of the finger members and extending through one of the slots to movably join the corresponding finger member to said element, wherein said element has four first openings therein, each first opening corresponding to one of the finger members, and wherein there are four flexible straps, each strap corresponding to one of the finger members and extending through the corresponding first opening in said element, one end of each strap being fixed to the terminal segment of the corresponding finger member and the other end being fixed to said displaceable member, and further comprising a fixed thumb member mounted on said hand member.

22. An amusement device, comprising:
(a) a grip member connected to an elongated arm:
(b) a flexible member connected to a shaft;
(c) said shaft being slidably housed within said arm;
(d) a first rod connected to said grip member, said first rod terminating in a hook;
(e) a string connected to said hook on said first rod and extending along said shaft in the direction of said flexible member, wherein said string substantially surrounds a pulley rotatably connected to said arm through a slit in said shaft which is parallel to and running substantially the length of said shaft;
(f) said string further extending in the direction of said grip member wherein said string substantially surrounds a pulley rotatably connected to said shaft;
(g) said string again extending in the direction of the flexible member wherein the string attaches to a hook terminating a second rod;
(h) said second rod being connected to the flexible member.

23. The amusement device as described in claim 22, further comprising:
an elongated cylindrical spring, one end of which is connected to a hook connected to said shaft, the other end of said spring being connected to said arm, and the middle of said spring substantially surrounding a pulley rotatably mounted to said arm.

* * * * *